(12) United States Patent  
Kuta (10) Patent No.: US 6,437,861 B1  
(45) Date of Patent: Aug. 20, 2002

(54) COMPACT LIGHT INTEGRATION INTERFACE

(75) Inventor: John J. Kuta, Mississauga (CA)

(73) Assignee: EXPO Photonic Solutions Inc., Mississauga (CA)

( * ) Notice: Subject to any disclaimer, the term of this patent is extended or adjusted under 35 U.S.C. 154(b) by 0 days.

(21) Appl. No.: 09/504,883

(22) Filed: Feb. 16, 2000

(51) Int. Cl.[7] ................................................. G01J 1/04
(52) U.S. Cl. .................... 356/236; 356/216; 356/215; 250/205; 250/228
(58) Field of Search ................................. 356/236, 215, 356/216, 219, 220, 226; 250/341.7, 359.1, 494.1, 495.1, 228, 205; 362/298, 346–547

(56) References Cited

U.S. PATENT DOCUMENTS

| | | |
|---|---|---|
| 4,019,819 A | 4/1977 | Lodzinski |
| 4,035,085 A | 7/1977 | Seiner |
| 4,159,874 A | 7/1979 | Dearth et al. |
| 4,171,909 A | 10/1979 | Kramer et al. |
| 4,243,319 A | 1/1981 | Lodzinski |
| 4,288,160 A | 9/1981 | Lodzinski |
| 4,304,490 A | 12/1981 | Murakoshi et al. |
| 4,310,249 A | 1/1982 | Kramer |
| 4,360,268 A * | 11/1982 | Zucker et al. .............. 356/236 |
| 4,868,383 A | 9/1989 | Kurtz et al. |
| 4,881,811 A | 11/1989 | O'Brien |
| 4,912,720 A | 3/1990 | Springsteen |
| 5,079,678 A | 1/1992 | Parker |
| 5,103,385 A | 4/1992 | Federico et al. |
| 5,225,244 A | 7/1993 | Aharoni et al. |
| 5,241,459 A | 8/1993 | Kaplan et al. |
| 5,369,481 A | 11/1994 | Berg et al. |
| 5,399,877 A | 3/1995 | Carter et al. |
| 5,488,473 A | 1/1996 | Springsteen et al. |
| 5,537,203 A | 7/1996 | Carr |
| 5,596,450 A | 1/1997 | Hannon et al. |
| 5,661,556 A | 8/1997 | Schiff et al. |
| 5,689,364 A | 11/1997 | McGregor et al. |
| 5,745,234 A | 4/1998 | Snail et al. |
| 5,831,740 A | 11/1998 | Terauchi |

OTHER PUBLICATIONS

Weidner and Hsia, "Reflection properties of Pressed Polytetrafluoroethylene Powder", J. Opt. Soc. Am./vol. 71. No.7, Jul. 1981, pp. 856–861.

* cited by examiner

Primary Examiner—Frank G. Font  
Assistant Examiner—Sang H. Nguyen  
(74) Attorney, Agent, or Firm—Bereskin & Parr (57) ABSTRACT

A light integrating interface having a housing made substantially of pressed polytetrafluoroethylene powder. The interface has a non-spherical integrating cavity with a reflective inner surface, as well as a light energy input port and a light energy output port operatively coupled to the integrating cavity.

20 Claims, 5 Drawing Sheets

COMPACT LIGHT INTEGRATION INTERFACE

FIELD OF THE INVENTION

This invention relates to the field of light measuring devices, and in particular, to radiometers and other light energy sensors and non-imaging imaging light collection systems.

BACKGROUND OF THE INVENTION

Many applications of light require an accurate determination of the absolute or relative amount of light energy produced and or delivered. With the growing use of light in many industrial processes, there has been an increased demand for compact, robust, radiometrically accurate instruments for light energy quantification.

In typical light measuring applications, a radiometer is used to determine the quantity of light energy output from the light emitting device. However, because the emitted light energy may not be uniform (typically as a result of variations in input beam radiance and intensity profiles), for improved accuracy, non-imaging interfaces such as planar diffusers or integrating spheres are interposed between the emitter and the radiometer. Planar diffusers sacrifice transmission efficiency for uniformity and are limited in terms of the homogeneity they can provide for non-uniform sources. Prior art integrating spheres typically have a housing (which may be made out of aluminum or other rigid material), the inner spherical cavity of which is coated with a reflective substance. In their paper, "Reflection properties of pressed polytetrafluoroethylene powder", Weidner and Hsia discuss such a process of pressing polytetrafluoroethylene (PTFE) powder, which is an excellent diffuse reflector of light energy, to coat the inner surface of an integrating sphere.

U.S. Pat. No. 4,912,720 issued to Springsteen describes the process of molding pressed powder PTFE into a block, which is sintered through a heating process and machined into a desirable shape. U.S. Pat. No. 5,537,203 issued to Carr, utilizes this process to make integrating spheres.

Sufficiently accurate prior art integrating spheres tend to be relatively large and bulky, and/or the prior art techniques for manufacturing them are typically time consuming and expensive. There is accordingly a need for a compact integrating cavity. There is also accordingly a need for an integrating cavity which is relatively easy and inexpensive to manufacture.

SUMMARY OF THE INVENTION

The present invention is directed towards a light integrating interface.

The subject light integrating interface comprises a light energy input port having a longitudinal axis, a light energy output port having a longitudinal axis, and an integrating cavity operatively coupled to the input port and to the output port. The integrating cavity is non-spherical and comprises a reflective inner surface. The input port longitudinal axis lies in a plane which is substantially parallel to and displaced from a plane in which the output port longitudinal axis lies. The subject invention is also directed towards a light sensor comprising such a light integrating interface.

The subject invention is further directed towards a light integrating interface comprising a housing consisting substantially of pressed polytetrafluoroethylene powder, an integrating cavity positioned within the housing, a light energy input port having a longitudinal axis, and a light energy output port having a longitudinal axis. The input port and the output port are operatively coupled to the integrating cavity. Additionally, the subject invention is directed towards a light sensor comprising such a light integrating interface.

BRIEF DESCRIPTION OF THE DRAWINGS

The present invention will now be described, by way of example only, with reference to the following drawings, in which like reference numerals refer to like parts and in which.

DETAILED DESCRIPTION OF THE PREFERRED EMBODIMENTS

Figure 1A:
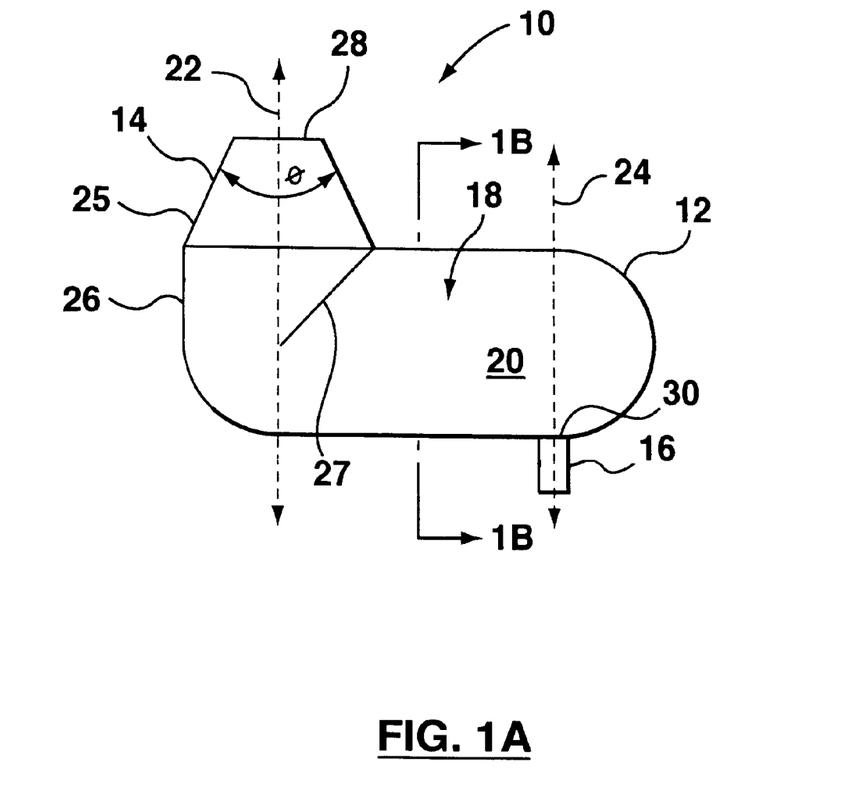
FIG. 1A is a side view of a light integration interface made in accordance with the present invention.
Figure 1B:
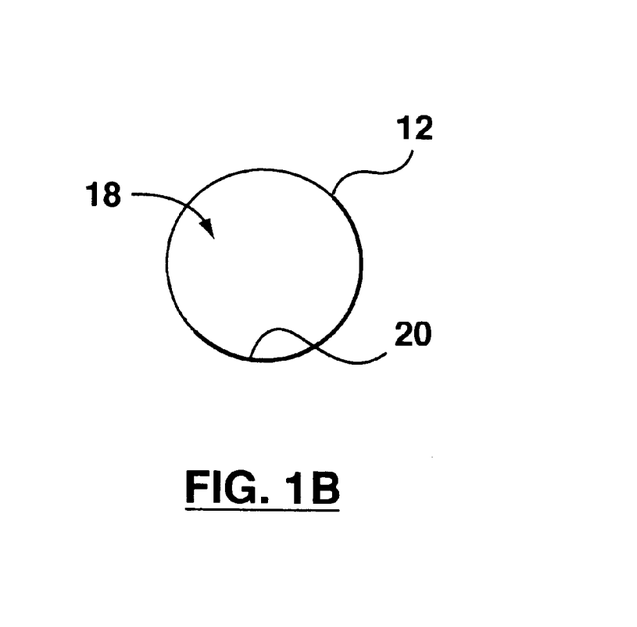
FIG. 1B is a cross-sectional view of the light integration interface of FIG. 1A, taken through the line 1B—1B.

Referring simultaneously to FIGS. 1A & 1B, illustrated therein is a preferred embodiment of the light integrating interface of the subject invention. The light integration interface, shown generally as 10, comprises a housing 12 having a light energy input port 14, a light energy output port 16, and an integrating cavity 18. The integrating cavity 18 is non-spherical and substantially ellipsoidal in shape and comprises a reflective inner surface 20. As shown in FIG. 1A, the integrating cavity 18 is preferably substantially obround in shape.

For clarity, it should be understood that reference to the term "light" herein and in the claims is intended to encompass the spectrum of electromagnetic radiation from ultraviolet to infrared and is not limited to visible radiation.

The light energy input port 14 and output port 16 have longitudinal axes 22, 24, respectively (shown in dotted lines). The input port axis 22 and the output port axis 24 are displaced such that light entering the cavity 18 through the input port 14 cannot directly exit through the output port 16 without interacting with the diffusely reflecting inner surface 20 of the cavity 18 a minimum of twice. As will be understood by one skilled in the art, such design is consistent with standard practice in the optical industry for the design of integrating cavities to ensure that the cavity is non-imaging. In the preferred embodiment, this is accomplished by aligning the input port axis 22 in a plane which is substantially parallel to and displaced from a plane in which the output port longitudinal axis 24 lies. In FIG. 1A, these planes are perpendicular to the sheet on which the FIG. 1A is drawn, and pass through the axes 22, 24, respectively. Preferably, axes 22, 24 are parallel. Additionally, the axes 22, 24 are also preferably perpendicular to the longitudinal axis of the integrating cavity 18.

The light energy input port 14 has a generally frusto-conical portion 25 and a truncated cylinder portion 26 which forms a bevelled shoulder 27 at its intersection with the main body of the cavity 18. The input port 14 also has an upper entrance 28 which is generally both circular and perpendicular to the input port axis 22. Preferably, the size of the upper entrance 28 is correlated to the source to be measured. In the preferred embodiment, the entrance 28 is sized to be at least as large as the emitting ends of light guides which will typically be used in conjunction with the interface 10. Additionally, the cone angle ø(subtending the sides of the frusto-conical portion 25) is preferably sized to match or exceed the largest divergence angle of light emitted from standard light guides, although this is not strictly necessary to achieve adequate performance. A cone angle øof at least 22° has been found to achieve acceptable results in the preferred embodiment for use with standard industrial light guides.

The output port 16 is generally cylindrical in shape (or otherwise shaped appropriately for the desired application) and forms a passageway from the cavity 18 to the exterior of the housing 12. The size of the output port 16 is also dependent on the requirements of the application. When the interface 10 is to be used in association with radiometers to determine the quantity of light energy received through the input port 14, the size of the output port 16 is selected to ensure that an appropriate amount of light energy exits the cavity 18 to be incident on the photodiode (or other form of photoreactive sensor) of the radiometer.

It is generally accepted in the industry that to achieve sufficiently accurate results, the total of the area bounded by the upper entrance 28 plus the area bounded by the exit 30 at which the output port 16 joins the cavity 18, does not exceed 5% of the total surface area of the reflective inner surface 20 of the cavity 18 (including the inner surface of the input port 16). As will be understood, by providing a sufficiently long cavity 18, it is possible to ensure that the surface area of the reflective inner surface 20 is large enough for accuracy purposes, while the transverse diameter of the cavity 18 remains comparatively small.

The reflective properties of PTFE are well known in the art. Preferably, the reflective inner surface 20 of the cavity 18 is at least coated with a compound consisting substantially of PTFE, or other highly reflective material.

While it is possible to machine the input port 14, the output port 16 and the cavity 18 of the housing 12 out of a block of sintered PTFE, as would be understood by one skilled in the art, as a further alternative, it has been found by the inventor that these structural components 14, 16, 18 may be formed (eg. by molding) out of pressed powder PTFE. Because pressed powder PTFE, once molded, possesses some structural integrity, the inventor has found that it is not necessary to subsequently sinter the molded PTE.

Figure 2A:
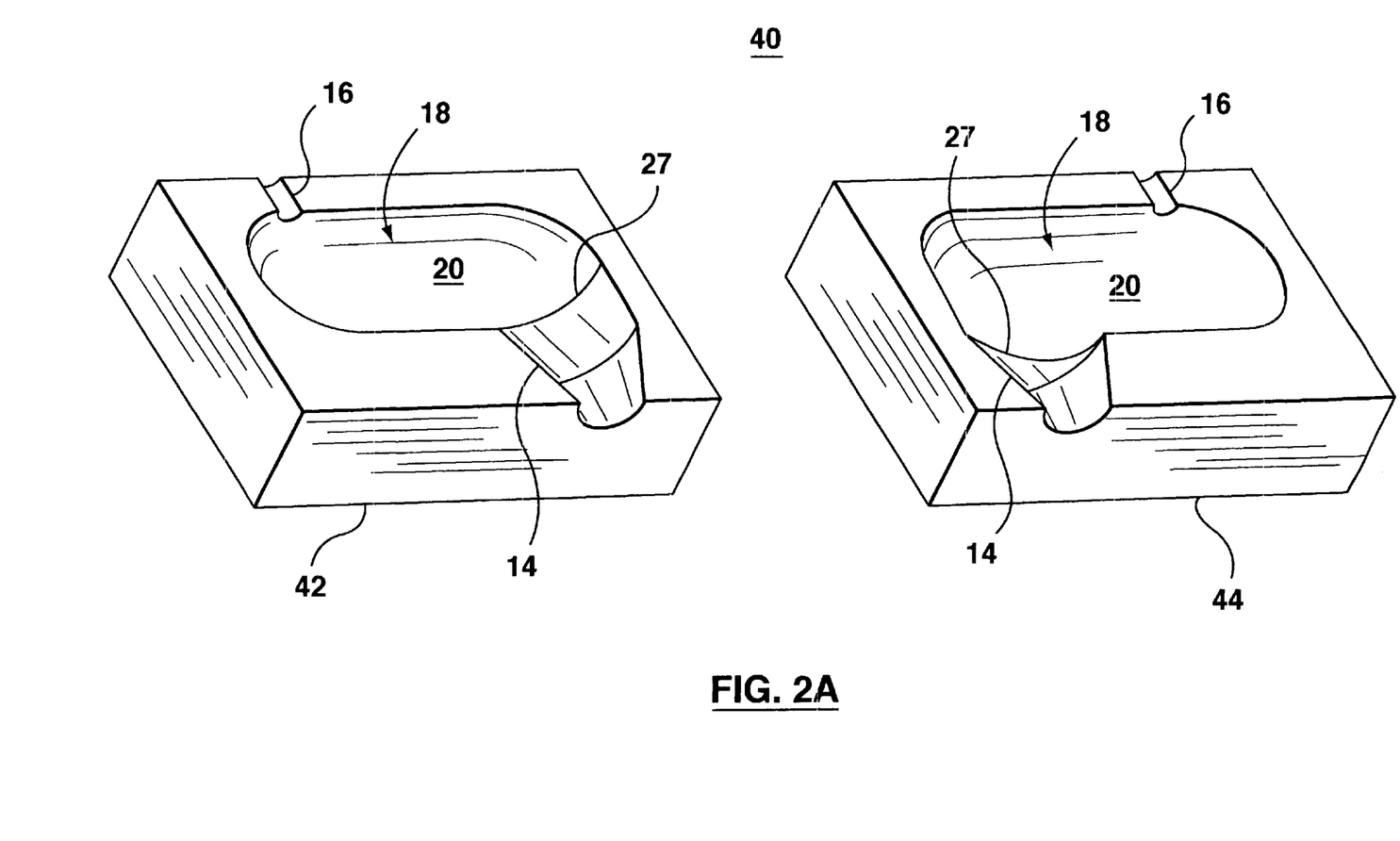
FIG. 2A is a front perspective view of two molded halves of pressed powder PTFE which when assembled form a light integration interface made in accordance with the present invention.
Figure 2B:
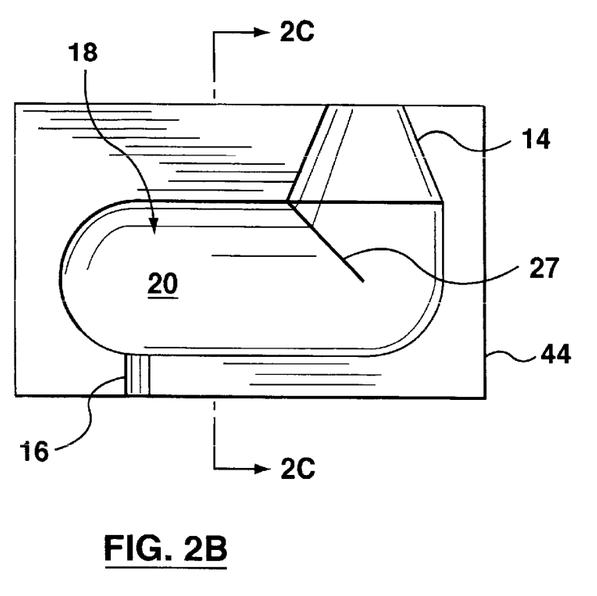
FIG. 2B is a side view of the first molded half of FIG. 2A.
Figure 2C:
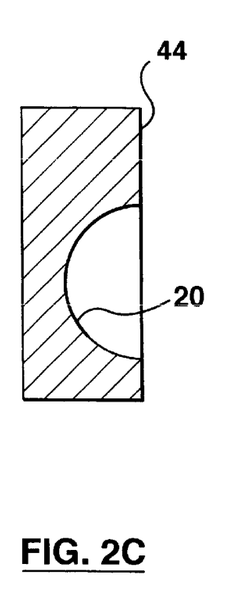
FIG. 2C is a cross-sectional view of the molded half of FIG. 2B, taken through the line 2C—2C.
Figure 2D:
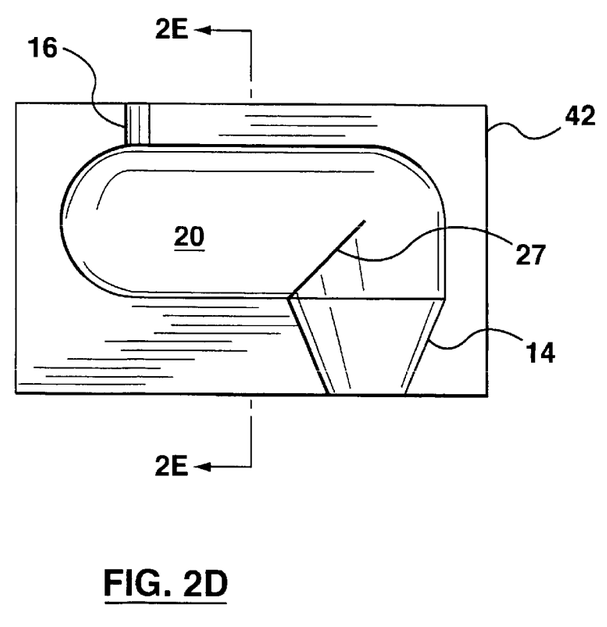
FIG. 2D is a side view of the second molded half of FIG. 2A.
Figure 2E:
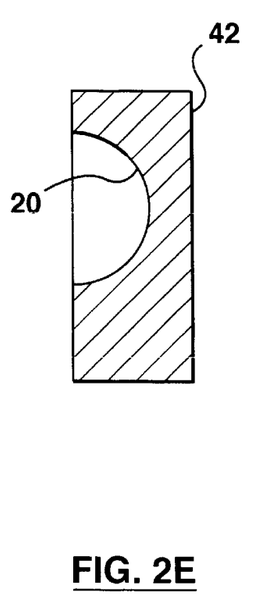
FIG. 2E is a cross-sectional view of the molded half of FIG. 2D, taken through the line 2E—2E.
Figure 2F:
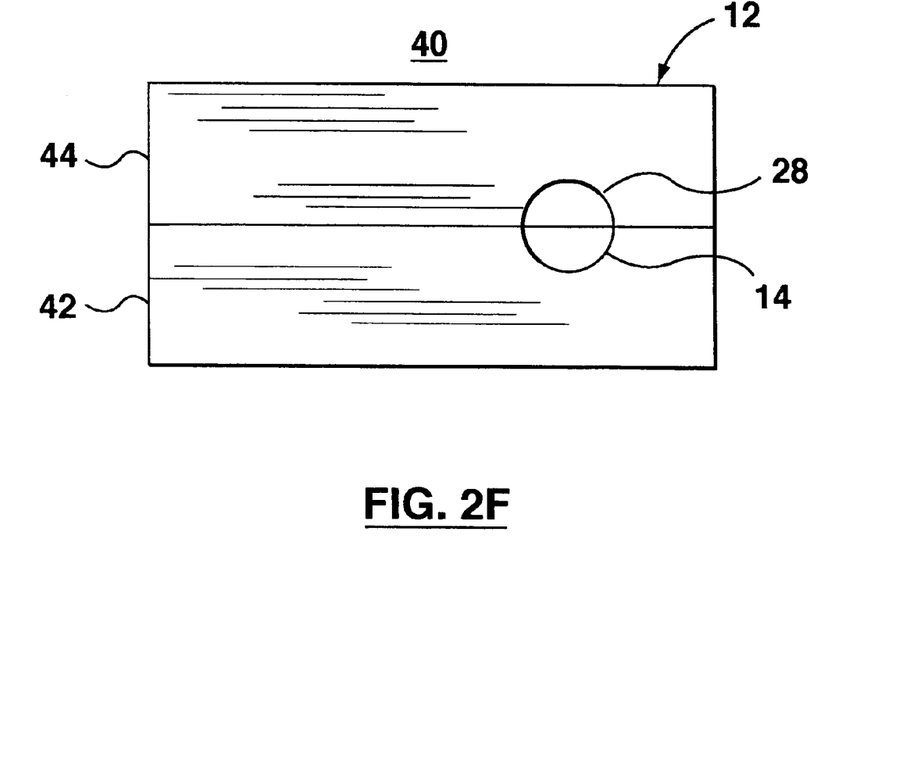
FIG. 2F is a front view of the two molded halves of FIG. 2A, assembled together to form a light integration interface made in accordance with the present invention.
Figure 2G:
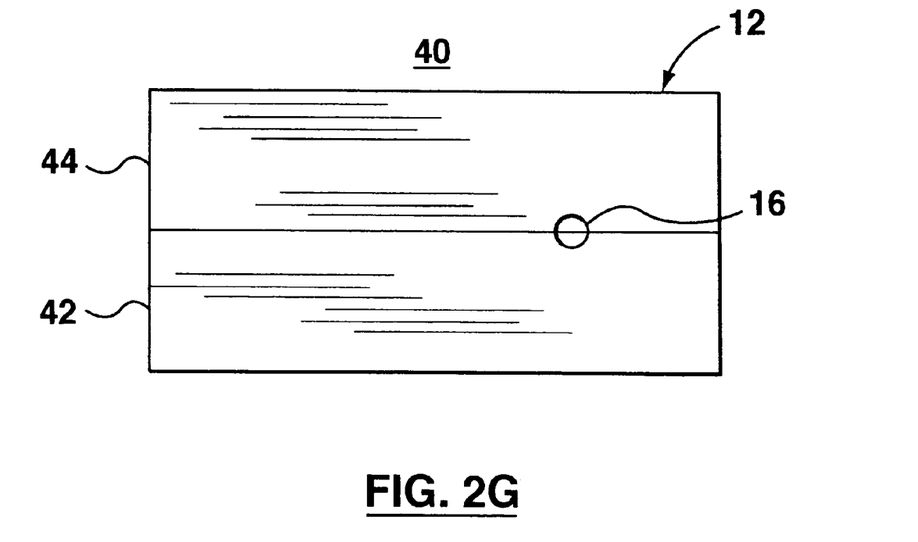
FIG. 2G is a rear view of the two molded halves of FIG. 2A, assembled together to form a light integration interface made in accordance with the present invention.
Figure 3:
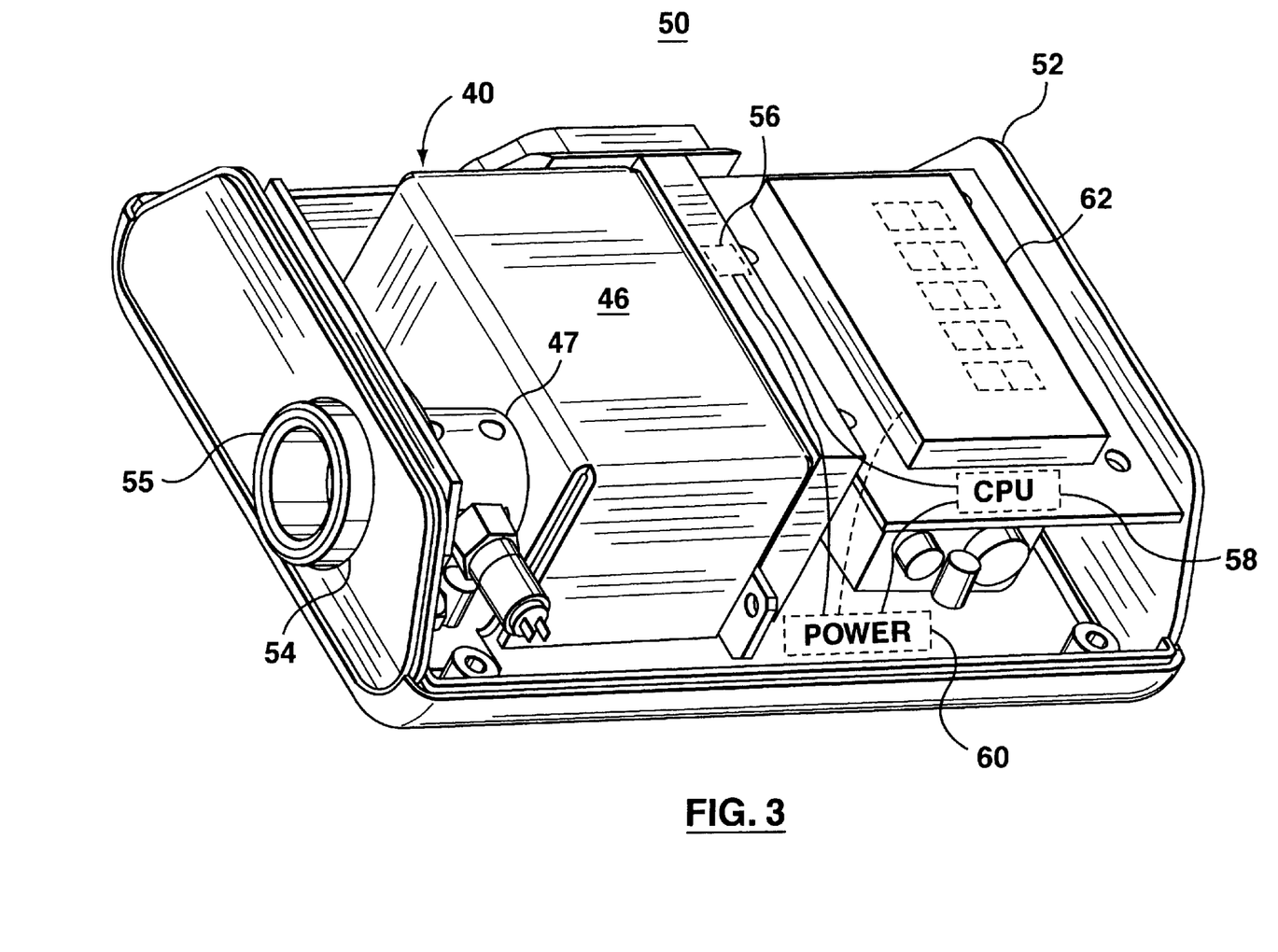
FIG. 3 is an overhead perspective and partially schematic view of a compact light sensor made in accordance with the present invention, with the top cover removed.

Illustrated in FIGS. 2A–2G is an integrating interface unit, shown generally as 40, having two molded halves 42, 44 of pressed powder PTFE which when placed properly together (as shown in FIGS. 2F & 2G) form the housing 12 containing the input port 14, the output port 16 and the cavity 18. It will be understood that molded half 42 is the reverse of molded half 44. Preferably, the unit 40 also comprises an external protective housing 46, typically formed of aluminum or plastic or other suitable (and preferably lightweight) material (as shown in FIG. 3, discussed below). The protective housing 46 comprises an input hole 47 and an output hole (not shown) sized at least as large as the external holes of the input port 14 and the output port 16, respectively. As will be understood, the external housing 46 provides additional structural support and protection to the molded halves 42, 44, as well as a means for maintaining the halves 42, 44 in proper alignment with each other.

As should also be understood, because the structural integrity of the molded PTFE is not strong, the transverse diameter of the cavity 18 cannot be so large that the walls of the housing 12 (shown by the shaded areas in FIGS. 2C & 2E) are unable to maintain the shape of the cavity 18. Similarly, it should be understood that the walls of the housing 12 need to be sufficiently thick to maintain the shape of the cavity 18. For the interface unit having the relative dimensions of the interface unit 40, walls of approximately 4 mm in thickness at their thinnest points have been found to provide sufficient structural integrity for a cavity 18 approximately 4.5 cm in length and having a transverse diameter of approximately 1.8 cm.

Molding the integrating cavity 18 out of pressed powder PTFE requires a relatively simple manufacturing process, as compared to machining a sintered block of PTFE. Powder PTFE having a density of 1.5 g/cm$^2$ should preferably be used, as it is known (as discussed in the Weidner and Hsia reference noted above) to provide the optimum combination of optical reflectance and structural integrity.

Referring now to FIG. 3 (in conjunction with FIGS. 2A–2G), illustrated therein is a light energy sensor unit, shown generally as 50. The sensor unit 50 comprises a sensor housing 52 to which has been mounted the light integrating interface unit 40 of FIGS. 2A–2G. The housing 52 has an external hole 54 through it as well as a docking port 55 which are aligned with the input port 14 of the interface unit 40, to allow light to enter from the outside of the housing 52 in through the docking port 55 and the input port 14, and into the main body of the integrating cavity 18. As will be understood, the docking port 55 is sized and shaped to mate with the emitting end of standard light guides used in industrial applications. However, it should be understood that alternate configurations of the docking port 55 may be required for applications involving light sources not which do not utilize light guides.

The sensor unit 50 also has a photodiode 56 (as indicated by the dotted outline), which is positioned to receive light energy emitted from the output port 16 of the interface 10. The sensor unit 50 also includes a suitably programmed CPU (central processing unit having both RAM and ROM data storage) 58, as well as a power supply 60 and a display 62.

As will be understood, the power supply 60 is electrically coupled to the CPU 58 and the display 62 to provide electrical power to each. The power supply 60 may include an electrical cord for connection to a standard electrical outlet, or other means such as a battery capable of providing sufficient electrical energy, in such manner as would be understood by one skilled in the art.

The display 62 will typically be an LCD or LED panel capable of displaying alphanumeric data to the user.

Because the integrating interface 10 has a smaller transverse diameter than an integrating sphere having an equivalent reflective surface area, it should be understood that the overall thickness of the sensor 50 may be smaller than a sensor unit incorporating such an integrating sphere.

In use, a user mates the emitting end of a light guide attached to a light emitting device with the docking port 55, and causes the light emitting device to commence emitting light energy. The CPU 58 is programmed to initialize itself to take a light energy reading when light energy is detected by the radiometer 56.

The light energy emitted from the light guide is directed through both the docking port 55 and the input port 14 and into the integrating cavity 18, where the light energy is diffused through interacting with the reflective inner surface 20. The diffuse light energy is then emitted through the output port 16, where it is received by the photodiode of the radiometer 56. The radiometer 56 then generates an electrical signal which is received by the CPU, correlated to the sensed intensity of the received light energy. The CPU then generates the appropriate command signals to the display 62, causing it to display alphanumeric information to the user correlated to the sensed power of the light energy.

It should be understood that while the light integrating interface 10 has been illustrated and described in connection with applications involving light radiometry, it should be understood that the interface 10 may also be useful in applications which require the emission of diffuse light energy.

Thus, while what is shown and described herein constitute preferred embodiments of the subject invention, it should be understood that various changes can be made without departing from the subject invention, the scope of which is defined in the appended claims.

I claim:

1. A light integrating interface for use in a radiometer, the interface comprising:

(a) an integrating cavity;

(b) a light energy input port having an input longitudinal axis and operatively coupled to the integrating cavity;

(c) a light energy output port having an output longitudinal axis and operatively coupled to the integrating cavity;

(d) wherein the integrating cavity is non-spherical and comprises a reflective inner surface;

(e) wherein the input port longitudinal axis lies in a first plane and wherein the output port longitudinal axis lies in a second plane, and wherein the first plane is substantially parallel to and displaced from the second plane such that light energy entering the integrating cavity through the input port interacts with the inner surface at least twice before exiting the integrating cavity through the output port; and (f) wherein the input port longitudinal axis and the output port longitudinal axis are substantially perpendicular to the longitudinal axis of the integrating cavity.

2. The light integrating interface of claim 1 wherein the input port longitudinal axis is substantially parallel to the output port longitudinal axis.

3. The light integrating interface of claim 1 wherein the integrating cavity comprises a first end and a second end, and wherein the input port is proximate to the first end and the output port is proximate to the second end.

4. The light integrating interface of claim 1 wherein the input port is substantially frusto conical.

5. The light integrating interface of claim 1 wherein the reflective inner surface consists substantially of polytetrafluoroethylene.

6. The light integrating interface of claim 1 wherein the light integrating interface comprises a housing consisting substantially of pressed polytetrafluoroethylene powder.

7. The light integrating interface of claim 1, wherein the integrating cavity is substantially ellipsoidal in three-dimensional shape.

8. The light integrating interface of claim 1 wherein the integrating cavity is substantially obround in three-dimensional shape.

9. A light energy sensor comprising:

(a) a sensor housing;

(b) an integrating interface mounted to the sensor housing, the integrating interface having;

(i) an integrating cavity, (ii) a light energy input port having an input port longitudinal axis and operatively coupled to the integrating cavity, (iii) a light energy output port having an output port longitudinal axis and operatively coupled to the integrating cavity, (iv) wherein the integrating cavity is non-spherical and comprises a reflective inner surface, (v) wherein the input port longitudinal axis lies in a first plane and wherein the output port longitudinal axis lies in a second plane, and wherein the first plane is substantially parallel to and displaced from the second plane such that light energy entering the integrating cavity through the input port interacts with the inner surface at least twice before exiting the integrating cavity through the output port and, (vi) wherein the input port longitudinal axis and the output port longitudinal axis are substantially perpendicular to the longitudinal axis of the integrating cavity;

(c) a docking port aligned with the input port; and (d) a light energy detector positioned to receive light energy emitted from the output port.

10. A light energy sensor as claimed in claim 9, further comprising:

(a) a processor operatively coupled to the detector; and (b) a display operatively coupled to the processor.

11. A light integrating interface comprising:

(a) a housing consisting substantially of pressed polytetrafluoroethylene powder;

(b) an integrating cavity formed within the housing;

(c) a light energy input port having a longitudinal axis, wherein the input port is operatively coupled to the integrating cavity; and (d) a light energy output port having a longitudinal axis, wherein the output port is operatively coupled to the integrating cavity.

12. The light integrating interface of claim 11, wherein the integrating cavity is non-spherical.

13. The light integrating interface of claim 11, wherein the integrating cavity is substantially obround in three dimensional shape.

14. The light integrating interface of claim 11, wherein the input port longitudinal axis and the output port longitudinal axis are substantially perpendicular to the longitudinal axis of the integrating cavity.

15. The light integrating interface of claim 11 wherein the input port longitudinal axis is substantially parallel to the output port longitudinal axis.

16. The light integrating interface of claim 11 wherein the integrating cavity comprises a first end and a second end, and wherein the input port is proximate to the first end and the output port is proximate to the second end.

17. The light integrating interface of claim 11 wherein the input port is substantially frusto conical.

18. The light integrating interface of claim 11, wherein the input port longitudinal axis lies in a first plane and wherein the output port longitudinal axis lies in a second plane, and wherein the first plane is substantially parallel to and displaced from the second plane such that light energy entering the integrating cavity through the input port interacts with the inner surface at least twice before exiting the integrating cavity through the output port.

19. A light energy sensor comprising:
(a) a sensor housing;
(b) the integrating interface of claim 11 mounted to the sensor housing;
(c) a docking port aligned with the input port; and
(d) a light energy detector positioned to receive light energy emitted from the output port.

20. A light energy sensor as claimed in claim 19, further comprising:
(a) a processor operatively coupled to the detector; and
(b) a display operatively coupled to the processor.

* * * * *

UNITED STATES PATENT AND TRADEMARK OFFICE
CERTIFICATE OF CORRECTION

PATENT NO. : 6,437,861 B1  
DATED : August 20, 2002  
INVENTOR(S) : John J. Kuta It is certified that error appears in the above-identified patent and that said Letters Patent is hereby corrected as shown below:

<u>Title page,</u>  
Item [73], Assignee, replace "EXPO" with -- EXFO --

<u>Column 5,</u>  
Lines 37 and 39, add -- port -- before "longitudinal axis";

<u>Column 6,</u>  
Line 50, replace "a" before "longitudinal axis" with -- an input port --;  
Line 53, replace "a" before "longitudinal axis" with -- an output port --;  
<u>Column 8,</u>  
Line 3, replace "the" before "integrating" with -- an --;  
Line 3, delete "of claim 11";  
Line 4, delete ";" and replace by -- , --; and  
Line 4, after "the sensors housing," insert  
-- the integrating interface having:  
(i) a housing consisting substantially of pressed polytetrafluoroethylene powder,  
(ii) an integrating cavity formed within the housing,  
(iii) a light energy input port having an input port longitudinal axis, wherein the input port is operatively coupled to the integrating cavity, and  
(iv) a light energy output port having an output port longitudinal axis, wherein the output port is operatively coupled to the integrating cavity; --

Signed and Sealed this

Sixteenth Day of September, 2003

JAMES E. ROGAN  
*Director of the United States Patent and Trademark Office*